…………………………350/345

XR 3,653,138

United States Patent
Cooper 3,653,138

Apr. 4, 1972

[54] CONTRASTING BACKGROUND DISPLAY

[72] Inventor: Irvin J. Cooper, White Bear Lake Township, Ramsey County, Minn.

[73] Assignee: Minnesota Mining and Manufacutring Company, St. Paul, Minn.

[22] Filed: Apr. 13, 1970

[21] Appl. No.: 27,843

[52] U.S. Cl. ...................40/130 R, 350/160 P, 40/106.1, 40/132 E
[51] Int. Cl. ...........................................G09f 13/06
[58] Field of Search ..............40/28 C, 130 H, 132 E, 106.52, 40/132, 130, 106.1; 161/3.5, 6; 350/160, 160 P, 161

[56] References Cited

UNITED STATES PATENTS

| 2,026,713 | 1/1936 | Terwilliger | 40/132 E |
| 3,524,789 | 8/1970 | Olsen | 161/6 |
| 3,499,112 | 3/1970 | Heilmeier et al. | 350/161 X |
| 1,846,533 | 2/1932 | Thompson | 40/106.1 |
| 2,998,667 | 9/1961 | Darnell et al. | 40/132 |

*Primary Examiner*—Robert W. Michell
*Assistant Examiner*—Richard Carter
*Attorney*—Kinney, Alexander, Sell, Steldt & Delahunt

[57] ABSTRACT

Contrasting background for display of letters, numbers, or other indicia is provided by using a sheet of louvered material in which thin parallel opaque louvers are set in a transparent matrix at an angle to the faces of the sheet. Light is made to pass through the louvered sheet generally parallel to the louvers at an angle to the faces of the sheet to display indicia defined by a differential pattern of light diffusive and transparent areas. The light diffusive areas direct a portion of the incident light to an observer while the louvers are seen in contrast through the transparent areas.

3 Claims, 2 Drawing Figures

PATENTED APR 4 1972

3,653,138

INVENTOR.
IRVIN J. COOPER
BY Kinney, Alexander,
Sell, Steldt & DeLaHunt
ATTORNEYS

CONTRASTING BACKGROUND DISPLAY

This invention relates to display devices and particularly to display devices in which a contrast is to be maintained between the article being displayed and the background under both ambient and nighttime lighting. In addition this invention relates to display devices which are useful for providing the positive appearance of a photographic negative and for signs and alphanumeric displays.

It is often difficult to demonstrate numerals by suitable background which is in sharp enough contrast that is visible both by daylight including ambient lighting or under conditions of very low ambient lighting by transillumination and from behind. A suitable example would be the exit signs in a moving picture theatre which must be visible both when the lights are on and after the lights have been turned off. Another situation in which contrast is desired of somewhat similar type is in viewing black and white picture negatives. In this case in order to see the positive the unexposed portion must appear black as it will in the print and the black part of the negative must appear in light color. In other words, contrast is sought between the indicia that are present and the background.

It has now been found possible by using a louvered film to provide a background which can be illuminated at an angle such that the light passing through is sufficient to illuminate a display in front of the film and yet at the same time does not illuminate the background around that display. In addition, where desired, a colored filter may be provided in front of the display so that the display is seen in color other than that normal to it. The display may be of indicia or patterns in various desired forms. For example, it may be letters which are mounted directly on the louvered film, it may be a photographic negative which is placed in front of the film for viewing or it may be a nematic display by dynamic scattering as described, for example, in U.S. Pat. No. 3,499,112.

Louvered films of the type which are useful for this purpose are prepared as described in the copending application of Frederick O. Olsen, Ser. No. 660,754 filed on Aug. 15, 1967 and assigned to the assignee of this application, by the skiving of billets of alternating clear and black or other colored sheets. It will be recognized that the skiving of a sheet in which the black planes are normal to the surface will give the wrong angles but by deformation it is possible to obtain sheets in which louvers are properly inclined. Such films can also be produced by cutting from a block of material made with the desired angles.

As indicated above the display material may be of any of several types. In each case a different embodiment of the invention is obtained. Two of these embodiments are explained by reference to the accompanying drawings in which.

Figure 1:
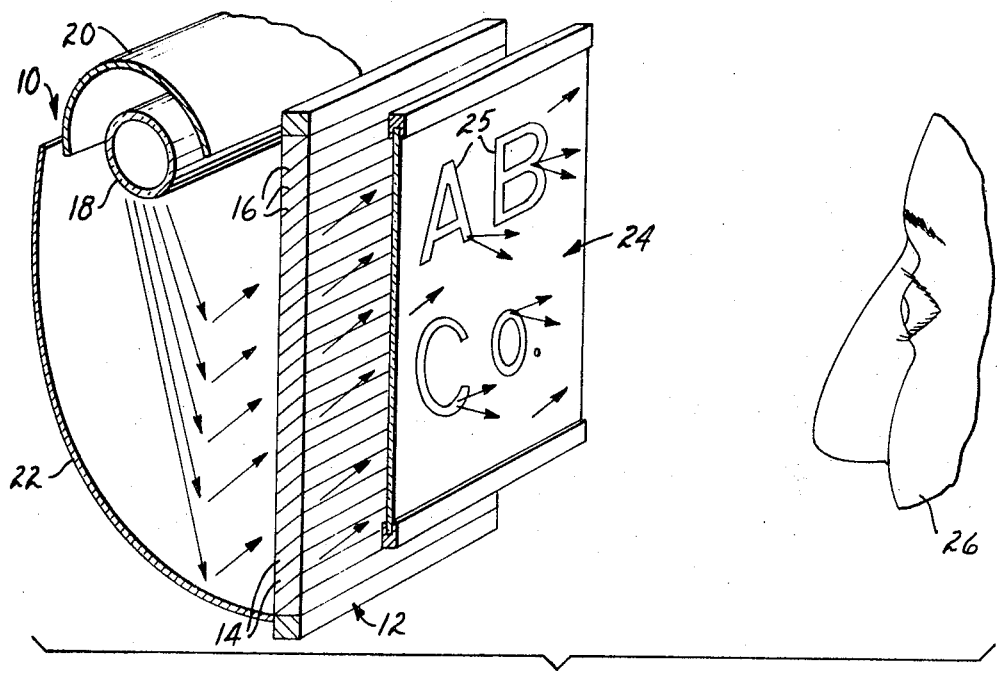
FIG. 1 is a perspective view in section of a first embodiment of the present invention.
Figure 2:
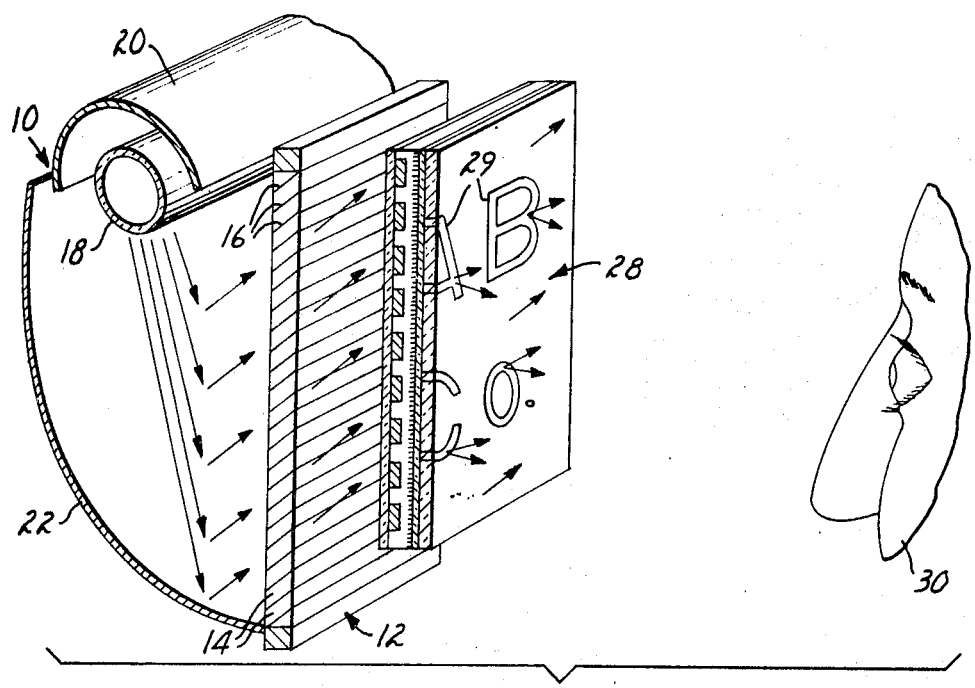
FIG. 2 is a perspective view in section of a second embodiment of the present invention.

The display of the present invention as illustrated in FIGS. 1 and 2 includes a light source 10 and a sheet of louvered material 12.

The sheet of louvered material 12 comprises a transparent matrix 14 in which a plurality of generally parallel thin opaque louvers 16 are set at an angle to the faces of the sheet, the louvers 16 being spaced with opposed edges of adjacent louvers at least contacting a single plane normal to the faces of the sheet 12 to prevent transmission of light striking the sheet 12 perpendicular to the faces thereof. The sheet 12 is preferably formed of a thermoplastic material, the matrix 14 being transparent and the louvers 16 being opaque. A process for producing a louvered structure with louvers normal to the faces of the sheet is described in the aforementioned application of Frederick O. Olsen, Ser. No. 660,754 as including the steps of placing alternating clear and pigmented thermoplastic disks on a shaft, heating the composite while applying pressure to form a billet and skiving the billet while heating the surface of the billet immediately before contact with the skiving knife to a temperature sufficient to permit softening of the polymer at least to a depth contacting the skiving knife. Inclination of the pigmented louvers to the faces of the sheet so that opposed edges of adjacent louvers at least contact a single plane normal to the faces of the sheet may be produced by placing the perpendicularly louvered sheet between a pair of metal plates and heating the sheet while slowly moving one of the metal plates in the desired direction of louver inclination. Further inclination of the louvers 16 would then produce overlapping of the opposed edges of adjacent louvers which may be desired to assure the prevention of light transmission normal to the faces of the sheet 12. By appropriate coloration of the disks prior to formation of the billet, the louvers 16 may provide any desired contrasting background for the display as will be hereinafter described.

The light source 10 preferably comprises a cylindrical lamp 18 positioned to one side of the sheet of louvered material 12 and extending parallel thereto, a semicylindrical reflector 20 adjacent the lamp 18 and a parabolic reflector 22. The parabolic reflector 22 is positioned to cooperate with the semicylindrical reflector 20 to direct light produced by the lamp 18 into paths parallel to the planes of the louvers through the matrix 14 of the louvered sheet 12 between the louvers 16 and provide equal intensity illumination across the louvered sheet 12.

The article to be displayed is positioned on the opposed side of the sheet of louvered material 12 from the light source 10 so as to be illuminated by light passing through the matrix 14 between the louvers 16. An article to be displayed for use with the present invention includes a differential pattern of light diffusive and transparent areas defining the indicia to be displayed. This may be accomplished by affixing the light diffusive indicia directly to the opposed face of the sheet of louvered material 12 whereby the matrix 14 of the louvered sheet 12 provides a transparent background substantially surrounding the indicia. In this instance an observer positioned out of the path of the light passing through the matrix 14 between the louvers 16 would observe the indicia due to the diffusion of the light by the indicia while the louvers 16 will provide a visible contrasting background for the indicia. Thus, if the louvers 16 are black the indicia will appear in light color on a black background. The louvers 16 may have any color contrasting with the coloration of the indicia and a colored filter may be placed between the indicia and the observer to provide further coloration as desired. Such positioning of a colored filter provides continuity of color contrast with both ambient and backlighting.

Referring now to FIG. 1 there is illustrated one embodiment of the present invention utilizing a black and white photographic negative 24 as the article to be displayed. In this embodiment the louvers 16 are preferably black to provide the proper background coloration. Light passing through the matrix 14 of the louvered sheet 12 between the louvers 16 strikes the entire back surface of the negative 24. In the unimaged areas the negative 24 is transparent and the light rays continue their inclined path and are not seen by an observer 26. Light striking the imaged areas of the negative 24 is diffused by the indicia 25 so that at least a portion of the light striking the imaged areas is diffused and directed to the observer 26. With the black background provided by the louvers 16 and observable through the transparent unimaged areas, the light diffused from the indicia 25 on the negative 24 makes them appear in light color on a black background as would a positive made from the negative 24.

Referring now to FIG. 2 there is illustrated a second embodiment of the present invention utilizing a nematic liquid crystal display device 28. Nematic liquid crystal displays are well known in the art and typically include a pair of spaced parallel transparent plates which support electrode strips on their adjacent faces. The space between the plates is filled with a nematic crystal composition of a type that exhibits turbulent motion upon the application of an electric field which produces an electric current in the film. The display 28 is normally generally transparent and upon causing an electric current to flow through selected electrodes the liquid crystal layer becomes turbulent in selected areas and gives rise to scattering or diffusion of light incident on that portion of the display. By proper selection of the current flow, light diffusive indicia 29 are generated in the display 28. In this embodiment the louvers 16 are preferably black and when the display is backlit as illustrated and no indicia 29 are generated, the light passes through the matrix 14 between the louvers 16 and continues through the liquid crystal display 28 so that an observer 30 sees only the black background provided by the louvers 16. When indicia 29 are generated in the display 28 light striking the indicia 29 is diffused so that portions thereof are directed to the observer 30. The indicia 29 then appear in light color on the black background provided by the louvers 16. This embodiment is also useful in instances where there is ambient lighting during daylight hours since the generated indicia 29 in diffusing light will reflect a portion back to the observer 30 while the black background provided by the louvers 16 will absorb light passing through the light transmissive areas of the display 28. This then is an excellent display for use when it is desired to display indicia both during daylight and during periods of very low ambient lighting.

Having thus described the present invention, what is claimed is:

1. A display device comprising:
    a sheet of louvered material having a plurality of generally parallel thin opaque louvers set in a transparent matrix at an angle to the faces of said sheet, said louvers being spaced with opposed edges of adjacent louvers at least contacting a single plane normal to said faces to prevent transmission of light striking said sheet perpendicular to said faces,
    a light source positioned to one side of said sheet of louvered material to direct light through said matrix between said louvers along paths generally parallel to said louvers, and
    an article to be displayed positioned on the opposed side and parallel to said sheet of louvered material to be illuminated by radiation from said light source passing through said matrix between said louvers, said article including a differential pattern of light diffusive and transparent areas defining the indicia to be displayed and said differential pattern being at least partially of contrasting coloration to said opaque louvers so that said differential pattern is visible both from ambient light and under illumination.

2. A display device comprising:
    a sheet of louvered material having a plurality of generally parallel thin opaque louvers set in a transparent matrix at an angle to the faces of said sheet, said louvers being spaced with opposed edges of adjacent louvers at least contacting a single plane normal to said faces to prevent transmission of light striking said sheet perpendicular to said faces,
    a light source positioned to one side of said sheet of louvered material to direct light through said matrix between said louvers along paths generally parallel to said louvers, and
    a nematic liquid crystal display device positioned on the opposed side of and parallel to said sheet of louvered material to be illuminated by radiation from said light source passing through said matrix between said louvers, said liquid crystal display device providing a differential pattern of light diffusive and transparent areas defining the indicia to be displayed visible both from ambient light and under illumination.

3. A display device comprising:
    a sheet of louvered material having a plurality of generally parallel thin opaque louvers set in a transparent matrix at an angle to the faces of said sheet, said louvers being spaced with opposed edges of adjacent louvers at least contacting a single plane normal to said faces to prevent transmission of light striking said sheet perpendicular to said faces,
    a light source positioned to one side of said sheet of louvered material to direct light through said matrix between said louvers along paths generally parallel to said louvers, and
    a dark and light photographic transparency positioned on the opposed side of and parallel to said sheet of louvered material to be illuminated by radiation from said light source passing through said matrix between said louvers so that under illumination the dark and light areas of said transparency appear light and dark respectively.

* * * * *